United States Patent [19]
Lundquist et al.

[11] Patent Number: 5,222,100
[45] Date of Patent: Jun. 22, 1993

[54] RANGE BASED ACQUISITION SYSTEM

[75] Inventors: Alan E. Lundquist, Salt Lake City; John W. Zscheile, Jr., Farmington; Samuel C. Kingston, Salt Lake City, all of Utah

[73] Assignee: Unisys Corporation, Blue Bell, Pa.

[21] Appl. No.: 903,407

[22] Filed: Jun. 24, 1992

[51] Int. Cl.$^5$ .............................................. H04K 1/00
[52] U.S. Cl. ........................................ 375/1; 342/112; 380/46
[58] Field of Search ................. 375/1; 342/112 R; 380/46

[56] References Cited

U.S. PATENT DOCUMENTS

| | | |
|---|---|---|
| 4,630,283 | 12/1986 | Schiff ........................................ 375/1 |
| 5,022,049 | 6/1991 | Abrahamson et al. ................. 375/1 |
| 5,048,053 | 9/1991 | Mower et al. ........................... 375/1 |

Primary Examiner—David Cain
Attorney, Agent, or Firm—John B. Sowell; Mark T. Starr

[57] ABSTRACT

A novel range based acquisition system includes a receiver for receiving PN encoded signals coupled to a novel range based variable dwell correlator which detects and acquires uniquely timed received transmitter PN encoded signals employing different search dwell times for each of the estimated ranges from which the receiver transmitted PN encoded signals are being propagated so as to enhance the speed of acquisition of said PN encoded signals.

18 Claims, 2 Drawing Sheets

RANGE BASED ACQUISITION SYSTEM

BACKGROUND OF THE INVENTION

1. Field of the Invention

The present invention relates to a apparatus and method for increasing the speed of acquisition of data signals modulated onto a high frequency pseudonoise code. More particularly, the present invention relates to a novel range based data acquisition and ranging system for data links employing spread spectrum communication codes.

2. Description of the Prior Art

Ranging systems for data links are well known. Our U.S. Pat. No. 4,817,001 explains that ranging systems are classified in U.S. Class 342, subclass 112R and 4512458 and are conveniently subclassified by the method of the coding of the data being transmitted. One class of coding systems employs pseudonoise (PN) spread spectrum codes in the data links which permits data to be modulated onto the PN code transmitted as weak spectral signals which are decoded at the receiver. When the receiver has a PN code generator which is synchronized with the PN code generator in the transmitter, it is possible to recover the data and to also determine the range between the receiver and the transmitter knowing the propagation delay of the PN code.

One of the problems associated with PN transmitters/receiver data links and ranging systems is that once an outage occurs between the receiver and the transmitter, it is necessary to acquire or reacquire the PN code. When the distance between the receiver and the transmitter changes, the PN code of the transmitting station must be searched at the receiver one chip at a time until the receiver PN generated search code locks onto and is synchronized with the signal being received. Heretofore, it was known that the dwell time for the search of a transmitted PN code signal had to be sufficiently long to detect the transmitted PN code at the longest anticipated range between the stations. Since power available for detection is known to vary inversely proportional to the actual to the maximum ranges squared $(R_M/R_A)^2$, it was known that four times the power was available at half the maximum range. However, the dwell or search time was set or predicated upon the weakest signal or longest range from the receiver to the transmitter.

It would be extremely desirable to provide an apparatus and a method for acquiring PN transmitted codes at any predetermined range which is faster than apparatus and methods employed in the prior art data link and ranging systems.

SUMMARY OF THE INVENTIONS

It is a principal object of the present invention to provide a novel range base acquisition system.

It is another principal object of the present invention to provide a range base acquisition system and method for enhancing the speed of acquisition of a transmitted data modulated PN code. It is a principal object of the present invention to provide a system and method for decreasing the power of a data link transmitter without increasing the acquisition time.

It is a principal object of the present invention to provide a novel range based variable dwell correlator and novel acquisition controller for either reducing the acquisition time at the receiver or reducing the amount of power required at the transmitter.

It is a principal object of the present invention to provide an apparatus and a system that may be retrofitted into data link ranging systems of the type having an accurate time base standard to rapidly determine range and to enhance acquisition time.

It is another principal object of the present invention to provide a novel acquisition controller for a data link receiver.

It is another principal object of the present invention to provide a novel acquisition controller which employs automatic variable dwell time over a search band range.

It is another principal object of the present invention to provide a novel acquisition controller which is adapted to employ a known range from transmitter to receiver so as to reduce acquisition time.

According to these and other objects of the present invention, there is provided a novel range base acquisition system for a data link receiver having a novel acquisition controller which automatically calculates different dwell times for searching chips of a PN code in a band of known predetermined ranges, thus, decreasing the search or acquisition time for the range being searched to a minimum or an optimum value.

DESCRIPTION OF THE PREFERRED EMBODIMENTS

Figure 1:
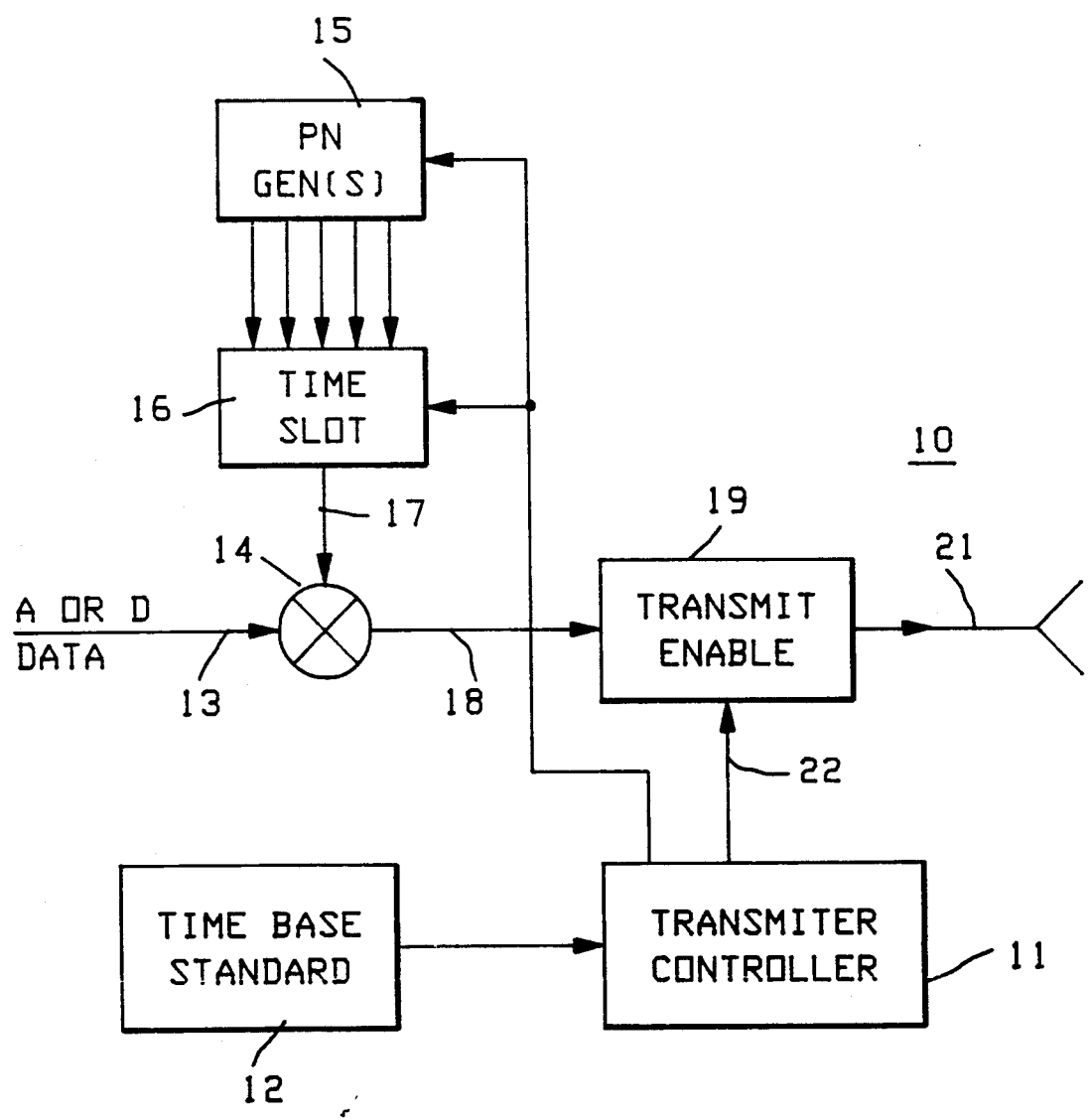
FIG. 1 is a schematic block diagram of a preferred embodiment transmitter having a time base standard and a transmitter controller.

Refer now to FIG. 1 showing a preferred or typical transmitter in schematic block diagram form of the type which are employed in aircraft, fixed or mobile ground data link stations and/or satellite to provide data link communications between aircraft to aircraft, fixed or mobile ground stations to aircraft and/or any mixture of aircraft and mobile or fixed ground stations communicating with satellites. When communications are conducted from aircraft to aircraft, it is helpful to know the exact or approximate range between aircraft so that the acquisition time of the data modulated onto a spread spectrum pseudonoise code may be acquired in a very short period of time. However, when the range from aircraft to aircraft is completely unknown except for the fact that the transmitting aircraft is within a maximum range it may be necessary to search the PN code from the transmitting aircraft from approximately zero to its maximum range.

The preferred embodiment transmitter system 10 is provided with a transmitter controller 11 which is coupled to a highly accurate time base standard 12 which has an accurate time of day and accurate clock. The analog or digital data on line 13 to be transmitted is coupled to a mixer 14. A PN generating system comprising a plurality of individually clock driven selectable PN generators 15 is coupled to a time slot generator 16 for providing a predetermined PN code on line 17 which is coupled to the mixer 14 so that the data on line 13 is modulated onto the PN code at line 18 and processed in transmitter 19 for transmission to all other data links in the data link system at antenna 21 at a predetermined time. The transmitter controller is shown having an enable input to transmitter 19 via line 22 to assure that the PN code being transmitted via antenna 21 is transmitted at a precise predetermined time as will be explained in greater detail hereinafter. Each vehicle or station is provided with a transmitting system 10 and each transmitter or station is provided with a time of day for transmitting a unique PN code or codes having data modulated onto the code. Thus, the stations transmit in the equivalent of a burst mode at a precise predetermined time using a PN code which is known to all receivers which have the same time of day time base standard, thus, all receivers know the exact time the bursts from all different receivers was initially transmitted.

When the receiver is located at the same location as the transmitter there is no delay in propagation time between transmitter and receiver, however, if the receiver is located 100 nautical miles from the transmitter, there will be a delay of approximately 600 microseconds transmission time from the transmitter to the receiver. This delay can be accurately detected at the receiver which also has a time base standard like clock 12 which enables the receiver to accurately determine the range between the transmitter and the receiver as will be explained hereinafter. When this range is known, the receiver only needs to search a small band of chips in order to acquire the data modulated PN signal being transmitted.

Figure 2:
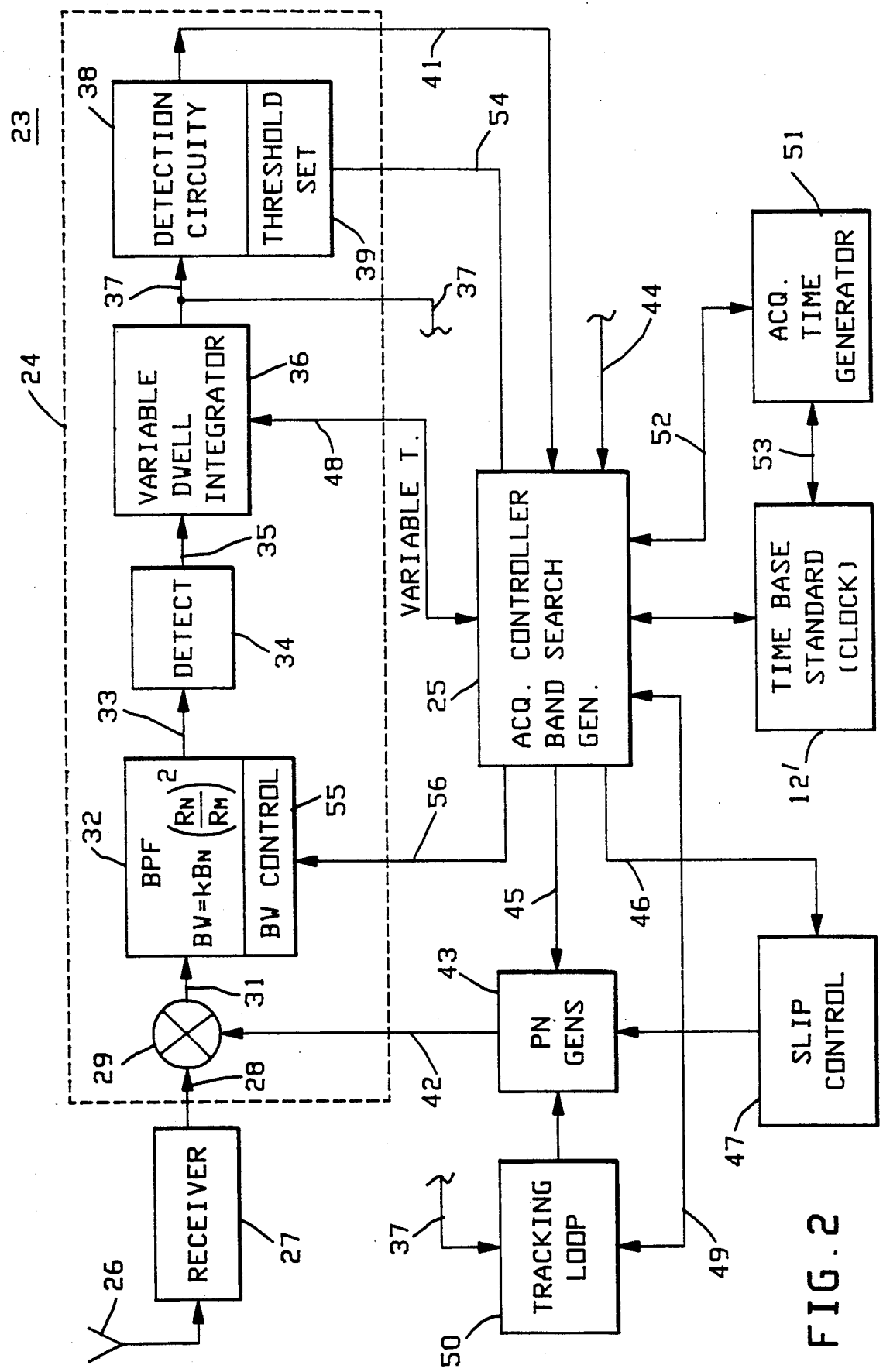
FIG. 2 is a schematic block diagram of a preferred embodiment range based acquisition system having a novel range base variable dwell correlator and acquisition controller and a time based standard.

Refer now to FIG. 2 showing a schematic block diagram of a preferred embodiment range based acquisition system 23 having a novel range base variable dwell correlator 24 and acquisition controller 25. The data modulated PN signal from the receiver of FIG. 1 is received at antenna 26 and applied to a processing receiver 27 to generate on output line 28 a processed signal which is applied to a mixer 29. When this PN signal is acquired, the output on line 31 comprises the acquired PN signal and data which is applied to a band pass filter 32 to produce a filtered output signal on line 33 comprising the data and the acquired PN signal. The detector 34 is preferably a square log detector which splits the input signal and multiplies it times itself or comprises an absolute value detector which produces the desired data signal on output line 35 when the PN codes approach synchronization. The data signal is accumulated over a predetermined dwell time in variable dwell integrator 36.

The prior art search time techniques require that the dwell times be sufficient to meet a minimum power available at the maximum range and heretofore were searched with this same minimum dwell time for all ranges. Since the power available at ranges R shorter than the maximum range is greater by a factor of $(R_{max}/R)^2$ it is possible to reduce the dwell time $T_d$ by a factor which is equal to $T_{max} T_d(R/R_{max})^2$. Thus, the search time can be optimized and the dwell time for each interval can be based on the range for that interval. The advantage is that for shorter ranges, there is more power available so that dwell times can be reduced compared to the maximum range. The overall result is a saving in total search time for equivalent levels of search hardware. In the ith interval, there will be additional power available due to the reduced range. Conversely, if each chip of each band is searched with the same power, it can be shown that the search or dwell time can be substantially reduced for shorter ranges.

Let the search or dwell time for each chip of a band N at maximum range $R_{max}$ equal $T_{max}$, then the search time $T_i$ for each chip at the ith band N at range $R_i$ is:

$$T_i = T_{max} \left( \frac{R_i}{R_{max}} \right)^2 \quad (1)$$

and the sum or total time $T_s$ for a chip in all bands N is:

$$T_S = \sum_i^N T_i \quad (2)$$

$$T_S = \sum_i^N T_{max} \left( \frac{R_i}{R_{max}} \right)^2 \quad (3)$$

$$T_S = T_{max} \left( \frac{1}{N^2} \right) \left[ \frac{N(N+1)(2N+1)}{6} \right] \quad (4)$$

$$T_S = T_{max} \frac{(N+1)(2N+1)}{6N} \quad (5)$$

when the search time $T_s$ is normalized for any band N for a simple comparative search model, the total search time $T_T = N T_N$, and $$\frac{T_S}{NT_N} = T \frac{(N+1)(2N+1)}{6N^2} \quad (6)$$

$$\frac{T_S}{NT_N} = \frac{1}{3} + \frac{1}{2N} + \frac{1}{6N^2} \quad (7)$$

Using the above normalized values for N bands, the reduced normalized search time for $T_N$ for a band N is shown in Table 1.

TABLE 1

Search Time $T_N$ Based Upon Dividing Range Into N Intervals and Searching Each Interval Using The Same Range-Based Power Level

| N | Normalized Search Time $T_N$ | Time Improvement Ratio |
|---|---|---|
| 1 | 1.000 | 1.000 |
| 2 | 0.625 | 1.600 |
| 3 | 0.518 | 1.930 |
| 4 | 0.469 | 2.132 |
| 5 | 0.440 | 2.273 |
| 6 | 0.421 | 2.375 |
| 7 | 0.408 | 2.451 |
| 8 | 0.398 | 2.513 |
| 9 | 0.391 | 2.558 |
| 10 | 0.385 | 2.597 |
| 20 | 0.346 | 2.888 |
| 100 | 0.339 | 2.950 |
| ∞ | 0.333 | 3.000 |

It will be noted that as the number of bands N approach infinity, the search time is reduced by a factor of one-third and the improvement ratio becomes approximately three. Further, it would be noted that the sixth to the ninth bands in a large number of bands has an improvement ratio factor of approximately two-and-one-half.

The analog signal accumulated in the variable dwell integrator 36 is coupled via line 37 to a detector circuit 38 which acts as a comparator to compare the accumulated output with a pre-set threshold value set in block 39 by acquisition controller 25 to produce an output on line 41 indicative of whether the received PN code has been acquired or whether further slipping of the PN code is required to achieve synchronization of the PN code presented on line 42 from PN generator 43. If the acquisition controller 25 knows the exact range or the approximate range from information presented on line 44, it is only necessary for the acquisition controller to search a small number of chips in the band N which contains the known range using the reduced dwell or search time $T_N$.

The preferred mode of operation of the structure shown in FIG. 1 is to search a chip of a predetermined band N and determine if the code is acquired and if the code is not acquired to apply signals on lines 45 and 46 to cause the slip control 47 to change the PN code being generated on line 42 by one chip and attempt acquisition for the predetermined dwell time presented on line 48 from acquisition controller 25. As will be explained hereinafter, the present invention structure may be operated in other modes of operation.

When a signal on line 41 to acquisition controller 25 indicates that the PN code has been acquired, the system switches from the acquisition mode to a tracking mode and a signal on line 49 is applied to the tracking loop 51 which tracks the incoming signal on line 37 and makes the final phase adjustment so that the PN code on line 42 is exactly matched with the incoming PN code on line 28.

In the preferred embodiment mode of operation, the time base standard 12' comprises a very accurate clock which has the identical real time as the time base standard 12 in the transmitter 10 shown in FIG. 1. When the plurality of data link stations are programmed so that a predetermined unique time slot is dedicated to each transmitter, the receiving station is programmed to receive the data modulated PN code from that unique station knowing its exact start of transmission time. Thus, the time of receipt of supplemental signals after acquisition and tracking has been obtained is an accurate indication of the exact range from the unique transmitting station to all receiving stations. In order to coordinate the transmission of the data modulated PN code from one unique transmitter, a time slot generator in the transmitter may also be provided and enabled by the transmitter controller 11. The receiver is provided with an acquisition time generator 51 which is coupled to the acquisition controller 25 via line 52 and the time base standard 12' via line 53. It will be understood that the generator 51 and clock 12' may be incorporated into the acquisition controller 25.

Since every transmitting station has its own unique time slot and all transmitters and receivers have the same time of day, the burst of transmitted data which occurs at the predetermined unique time is unique to only one of the transmitters. Thus, every station has its own designated transmission time which enables the receivers in all of the data links to update their known range to the transmitting station as well as to receive data. When the range or approximate range is known, this information can be supplied on line 44 so that the acquisition controller 25 need only search one band or a part of one band for rapid acquisition as was explained in our U.S. Pat. No. 4,817,001.Further, our U.S. Pat. No. 5,105,437 explains a novel programmable acquisition and tracking controller which permits the rapid acquisition and tracking of a incoming PN code.

Having explained how the dwell time for the search for an individual chip of a PN code may be reduced when the range is less than a maximum range, it will be understood that the total search time for any band N of a known or approximately known range may be substantially reduced. The same apparatus may be employed in a different mode of operation wherein the predetermined threshold at block 39 is set by the acquisition controller 25 on line 54. The threshold may be set lower than the desired threshold for actual acquisition. The signal on lines 37 and 41 can be monitored by the acquisition controller 25 during a fast scan of a number of chips in a range of bands where the transmitted code is expected. When an input indicative of partial acquisition is detected, the threshold may be changed and that range or band may be sensed at the higher threshold to achieve rapid acquisition.

The acquisition controller 25 of the system 23 is not limited to searching a single chip at any one chip time. Several chips may be searched in parallel by duplicating the correlator 24 and supplying each with a different slipped PN generated code from the PN generators 43.

In the preferred mode of operation, any known range information is employed to reduce the search time, however, if the complete range of bands needs to be searched, the search is preferably made from the closest band to the maximum range because the search or dwell time at the closer range is always reduced employing the preferred embodiment of the present invention where the variable dwell time $T_N$ when multiplied by the received PN signal is substantially maintained constant at the various ranges.

In yet another mode of operation when maximum security is desired, it is possible to have all receivers simultaneously search from the furtherest range band to the closest band. The transmitter may then sequentially reduce the power for each closer band, thus making it almost impossible for a hostile receiver to receive enough power to detect the data modulated PN signals. When the transmitter signal level is at an undetectable intercept power level, it is then possible to reduce the dwell time and decrease the time of acquisition at the close ranges.

Another feature of the present invention is to provide a variable band width control 55 which is coupled to the acquisition controller 25 via line 56. This controller can either generate a new band width for the filter 32 or select one of a plurality of band width filters which accomplish the same result. The band width for any particular band is decreased with increased range by a factor which is equal to K times the maximum band width multiplied by $(R_N/R_M)^2$.

Having explained that FIG. 2 is only illustrative of a search technique wherein the dwell time on line 48 is variable, depending on the range, it will be understood that the novel variable dwell time may be modified for a fast search to do a short dwell look using a reduced threshold or may be fixed for one or more bands or for a parallel search. Any of the prior art techniques can be enhanced by the novel acquisition controller which computes the most efficient variable dwell time for acquiring the received PN code. The present invention apparatus operates in its optimum mode when the incoming data rate is known and the minimum power requirements for the maximum range is known. The apparatus operates even more efficiently when the range or the approximate range to the transmitting station and its exact time of transmission is known. While a unique PN code is not required for every transmitting station, when the signals are timed division multiplexed, it is possible that it would be desirable to receive and decode several different PN codes provided that the information received was indicative of a known start time or contained coded information which included a start time which would enable accurate range determination.

Having explained a preferred embodiment of the present invention and modifications of employing the novel structure, it will be understood that the present invention structure may be incorporated into data links of the type which contain either navigational equipment or radar ranging equipment and/or other types of position locating equipment so as to enhance the speed of acquisition between data link stations. A search within a band N of known range will require slippage of a number of chip. Each chip time is equated to a fixed propagation time, thus, the estimated range time may be corrected to provide the actual range and this actual range may be confirmed by a subsequent or final burst of PN code after acquisition-lock-on or tracking.

What is claimed is:

1. A range base acquisition system for fast acquisition of transmitted PN codes, comprising:
   receiver means for receiving transmitted PN encoded signals,
   variable slip PN generator means for generating a PN code synchronized with said received PN encoded signals,
   a ranged based variable dwell correlator coupled to said receiver and to said variable slip PN generator means for detecting when synchronization of said generated PN code and said receive PN encoded signals has occurred, and
   acquisition controller means coupled to said variable slip PN generator means and to said range base variable dwell correlator for generating a search dwell time $\Delta T_i$ which is inversely proportional to the ratio of the actual range divided by the maximum range.

2. A range base acquisition system as set forth in claim 1 wherein said acquisition controller means comprises a time based standard having a clock that is synchronized in real time with a clock at the source of the transmitted PN code.

3. A range base acquisition system as set forth in claim 2 wherein said acquisition controller means comprises an acquisition time generator for generating information which enables said controller means to identify the source of the received transmitted PN encoded signals.

4. A range base acquisition system as set forth in claim 3 wherein said acquisition controller means comprises means for determining a best estimate of the actual range from said receiver means to said source of the received transmitted PN encoded signals and means for generating a dwell time for use by said variable dwell correlator which is less than a maximum dwell time required to produce a predetermined signal to noise ratio at a maximum range.

5. A range base acquisition system as set forth in claim 4 wherein the generated dwell time is employed to search a plurality of chips in a band N of predetermined chip width.

6. A range base acquisition system as set forth in claim 1 wherein said variable search dwell time $\Delta T_i$ for a given range $R_i$ is proportional to the maximum search dwell time $(T_{max})$ for a maximum range $(R_{max})$ multiplied by the square of the ratio of the actual to the maximum ranges $(R_i/R_{max})^2$.

7. A range base acquisition system as set forth in claim 1 wherein said range base variable dwell correlator comprises a variable band width controller coupled to said acquisition controller means for selecting one of a plurality of band widths which are compatible with the range indicative of the search dwell time.

8. A range base acquisition system as set forth in claim 1 which further includes means for generating a best estimate of the actual range coupled to said acquisition controller means.

9. A range base acquisition system as set forth in claim 1 wherein said range base variable dwell correlator comprises detection circuitry means having a threshold set input and wherein said acquisition controller means is programmed to perform a first fast sweep search at a first threshold input and a first dwell time to establish a band of ranges which contain said actual range and to perform acquisition of said PN encoded signals at a second and higher threshold input and a second longer dwell time.

10. A range base acquisition system as set forth in claim 1 wherein said range base variable correlator comprises a plurality of separate correlators for performing parallel searches and acquisitions of said transmitted PN coded signals.

11. A method of enhancing the speed of acquisition of transmitted PN encoded signals, comprising the steps of:
   applying a received transmitted PN encoded signal to a detection circuit having a dwell integration circuit, and
   reducing the dwell time from a maximum predetermined dwell time $(T_{max})$ at maximum range $(R_{max})$ to a nominal dwell time $(T_N)$ at the actual range $(R_i)$ being searched so that the signal to noise ratio and the power generated at each actual range $(R_i)$ being searched remains constant.

12. A method of enhancing the speed of acquisition of transmitted PN encoded signals as set forth in claim 11 which further includes the step of generating bands of ranges wherein each band contains a plurality of PN encoded chips, and
   employing the same reduced dwell time $(T_N)$ to search and acquire said PN encoded signals for each chip in each band of ranges.

13. A method of enhancing the speed of acquisition of transmitted PN encoded signals as set forth in claim 12 which further includes the step of dividing the maximum range to be searched into a plurality of individual bands of ranges wherein each contains a plurality of chips to be searched.

14. A method of enhancing the speed of acquisition of transmitted PN encoded signals as set forth in claim 11 wherein the step of reducing the dwell time $T_N$ at an actual range further includes computing the estimated actual range time $T_R$ by the step of subtracting a predetermined time of start transmission of said transmitter encoded PN signals from the actual time said transmitted signals are received at said detection circuit.

15. A method of enhancing the speed of acquisition of transmitted PN encoded signals as set forth in claim 11 which further includes the step of estimating the actual range R and actual range time $T_R$ by the step of employing a fast acquisition dwell time sweep over a plurality of ranges known to contain the actual range to determine a narrow band of ranges that contain the actual range and then increasing the dwell time to said dwell time less than the maximum dwell time to acquire said PN encoded signals.

16. A method of enhancing the speed of acquisition as set forth in claim 15 which further includes the step of calculating the actual range from transmitter to receiver by employing the number of chip slippage times required to obtain acquisition after start of search within a range N.

17. A method of enhancing the speed of acquisition as set forth in claim 11 which further includes the step of reducing the power of the transmitted PN encoded signals from a maximum level for a maximum range for a plurality of range bands to be searched before reducing said dwell time.

18. Method of enhancing security of transmitted PN encoded signals comprising the steps of:
   applying received transmitted PN encoded signals to a detection circuit having a dwell integration circuit, and
   reducing the power level of said transmitted PN encoded signals at a maximum range band to successively lower power levels at successively closer range bands, whereby the signal to noise ratio and the power received at reduced ranges remains substantially constant at each actual range band being searched.

* * * * *